United States Patent Office 3,429,846
Patented Feb. 25, 1969

3,429,846
POLYSILICIC ACID/TETRAFLUOROETHYL-
ENE SECONDARY ALCOHOL COPOLYMER
COMPOSITIONS
Max F. Bechtold, Kennett Square, Pa., and Wallace R.
Brasen, Wilmington, Del., assignors to E. I. du Pont de
Nemours and Company, Wilmington, Del., a corporation of Delaware
Filed June 15, 1965, Ser. No. 464,064
U.S. Cl. 260—29.6    27 Claims
Int. Cl. C08f 29/26, 45/04; C09d 3/78

ABSTRACT OF THE DISCLOSURE

Described and claimed are compositions comprising polysilicic acid and copolymers of fluorinated monomers with compounds containing secondary alcohol groups, e.g., copolymers of tetrafluoroethylene and hydrolyzed vinyl acetate, useful as scratch-resistant coatings for plastics, e.g., poly(methyl methacrylate).

FIELD OF THE INVENTION

Figure 1:
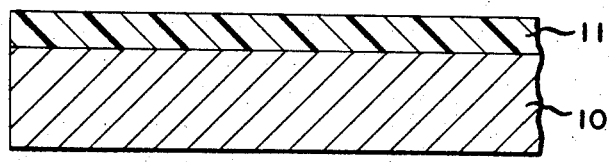

This invention relates to polymeric or complex compositions of matter, especially transparent compositions, having superior coating properties such as resistance to abrasion and adhesion when applied to solid substrates, to solutions from which coatings can be laid down, and to the application of coatings from the solutions.

BACKGROUND OF THE INVENTION

Increasingly severe demands are being made by architects and designers for various transparent enclosures, e.g., in autos and aircraft, and for windows, e.g., in schools, where breakage creates unsafe and undesirable conditions. In many applications, there is need for a transparent material that is capable of easy fabrication into various shapes and which also exhibits superior properties of resistance to shattering, abrasion, cleaning compounds, and the deleterious effect of weathering. Although glass provides many of these properties, for some uses it has disadvantages.

Polymers of organic materials have many properties that make them desirable for applications such as those mentioned above. Organic polymers, for example, are generally less dense than glass, have excellent resistance to shattering, and are easily formed or fabricated and sealed to supports. Plastics such as poly(methyl methacrylate), therefore, have found applications particularly as walls for enclosures, e.g., for aircraft. In general, however, the surface hardness of organic plastics is considerably inferior to that of inorganic glasses. Considerable effort has thus been expended in the preparation of scratch-resistant coatings. It has been shown in U.S. Patents 2,404,357, 2,404,426 and 2,440,711 that silica-containing solutions, when applied in carefully detailed procedures, can improve the surface characteristics of the substrate polymer. These materials have not achieved commercial importance since the techniques taught have several disadvantages, e.g., they are difficult and usually expensive to carry out if they are to provide resistant coatings of high quality. For example, heating the coating while it is pressed against a polished rigid surface to give a smooth surface and using a plurality of different coatings to obtain useful thickness and hardness are complicated and expensive procedures.

To obtain a proper balance of weather-, water- and scratch-resistance, optical perfection, thermal stability, etc., in the coated organic polymer along with ease and rapidity of application makes demands heretofore unanswered by coating and polymer technology. The coating must adhere strongly to the polymer substrate. It should be inert to the effects of weather, solvents, stains, soaps, salts, tar, etc. It should have a glass-like appearance and preferably a low index of refraction to provide a sheet of high light transmission and low reflectivity. It should also resist collection of dust by static charges, fogging, or icing, and have low surface friction. In addition, the coating should not seriously reduce the post-forming characteristics of the substrate, e.g., as by bending a heated polymer sheet.

It is an object of this invention, therefore, to provide solid, polymeric or complex materials suitable as protective coatings for solid substrates.

Another object is provision of complex coatings for solid substrates, which coatings may carry pigments.

A particular object is to provide improved transparent polymeric coatings for solid substrates, particularly transparent substrates.

Another object is to provide articles coated with the polymeric or complex coatings of the invention, particularly transparent articles.

A further object is provision of solutions from which the coatings of the invention can be applied.

A still further object is provision of a simple and economical process for preparing the coatings of the invention.

DESCRIPTION OF THE INVENTION

Figure 2:
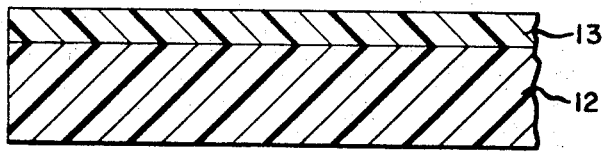

In accordance with the above-mentioned, and still other, objects of the invention there is now provided a novel transparent copolymeric or complex composition of matter suitable for use as an improved coating composition. Details will be evident from the remainder of the specification and from the drawings (not in scale) in which:

FIG. 1 shows the coating of the invention, made from the coating-forming composition thereof, applied to any solid substrate. In FIG. 1, the numeral 10 refers to the substrate, which as shown may be a metal, e.g., aluminum, and numeral 11 refers to a coating of any of the compositions of the invention laid down upon the substrate; and FIG. 2 shows a preferred embodiment of the invention in which the numeral 12 refers to a transparent plastic, e.g., poly(methyl methacrylate), employed as a solid substrate carrying a preferred transparent polymeric or complex coating of the invention designated by numeral 13, e.g., one based on a stable complex of silica and a hydrolyzed copolymer of tetrafluoroethylene and vinyl acetate.

In FIG. 1, the general figure, the coating is based upon a new and improved polymeric composition which comprises a polysilicic acid (10–90 parts by weight computed as $SiO_2$) and a preformed organic copolymer (90–10 parts) containing a plurality of fluorine atoms and a substantial number of alcoholic hydroxyl groups attached to carbon bearing no more than one hydrogen with the remaining bonds of the latter carbon being satisfied by bonds to other carbons, all as described more fully hereinafter.

The new coatings of this invention are laid down, or prepared, as by dipping from solutions, the active solids or complex-forming content of which corresponds in composition to the composition of the ultimate coatings, in a compatible solvent, generally including water and a lower alkanol, followed by removal of solvent as by air drying or baking. In either case, the removal of the solvent is irreversible and the coating thus prepared is surprisingly resistant to weathering and shattering and adheres well to the substrate, particularly an organic polymer.

The solutions from which the coatings are prepared are generally based on an aqueous alkanol, e.g., ethanol, t-butanol, etc., and may contain other adjuvant materials such as acetic acid or hydrochloric acid. The solids content by weight of the coating composition, based on the weight of the solution, is generally between about 2–25 percent, with 5 to 15 percent preferred.

As noted above, the coatings, and hence the solids content of the solution from which they are made, comprise polysilicic acid and a polymeric material containing a plurality of fluorine atoms and a number of secondary and/or tertiary alcohol groups. The polysilicic acid can be readily obtained from a solution, generally in a lower-alcohol solvent, of the material made by hydrolyzing an alkyl silicate, e.g., tetraethyl silicate, with at least 18% by weight of water.

The polymeric material of the solutions and of the coatings is provided by copolymers in which the secondary or tertiary alcoholic hydroxyls, i.e., bonded to a carbon itself bonded to at least two other carbons, are substantially the only hydroxyls present and preferably are attached to chain carbon of a copolymer having a degree of polymerization of at least 100 and preferably over 500. The ratio of fluorine to these hydroxyl groups is at least 1 to 2, and preferably there are 4 fluorines for each 1 to 7 hydroxyls. The invention includes polymers having such ratios provided by copolymers of fluoroolefins, particularly polyfluoroolefins, with vinyl esters followed by hydrolysis. Also included in the scope of this invention are copolymers of polyfluoroolefins, particularly those having —CE$_2$— groups, with polymerizable monomers containing secondary or tertiary hydroxyls. In the copolymers the ratio of the polyfluoroolefin to comonomer can vary within wide limits, but a ratio of about 1/1 to 1/7 is generally most useful; however, the ratio of fluorine to alcoholic hydroxyls is the more important in attaining the objects of this invention.

The film-forming composition contains polysilicic acid and preferably a hydrolyzed copolymer of polymerizable fluoroolefin with a vinyl ester, the ratio of silicic acid (as SiO$_2$) to copolymer being within the range of 10–90 to 90–10 on a weight basis and the molar ratio of fluoroolefin to vinyl ester being such that the ratio of fluorine atoms to hydroxyl groups is in the range 4/1 to 4/7. Optimum properties are provided when fluorine is present as a plurality of —CF$_2$— groups, e.g., as derived from copolymers wherein the fluoroolefin is a polyfluoroolefin, as in tetrafluoroethylene, the vinyl ester is vinyl acetate, and the weight ratio of polysilicic acid (SiO$_2$) to copolymer is about 20–50 to 80–50% and preferably 30–47% SiO$_2$ to 70–53% copolymer when the perfluoroolefin is tetrafluoroethylene, the molar ratio of the latter to hydrolyzed vinyl acetate being within the range of 1/2 to 1/5.

The final product formed in this invention has

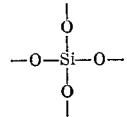

units wherein at least one oxygen is thought to be attached to another silicon and the other oxygens attached to the carbon of a hydroxy aliphatic fluorine-containing polymer or, if not all are satisfied by such bonds, to hydrogen. Thus, the final hard structure is thought to consist of two coextensive compatible transparent structures, one of a tough linear polymer chemically bonded at several points to a hard, three dimensional.

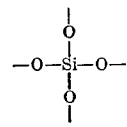

network. In other words, the unique structure can be pictured as a macromolecular (nonparticulate) reinforcement of the essentially linear organic polymer, or as a plasticization of a hard polyfunctional condensation polymer. It may be regarded as an interlocking copolymer or complex of silica and the preformed copolymer. The complexes are transparent but may carry entrapped pigment or other filler. Small amounts of solid adjuvant may on occasion be entrapped or occluded from the baths but these affect the interlocking complex in no substantial way.

There are several important properties in which the compositions of this invention, e.g., a polysilicic acid/hydrolyzed copolymer of a polyfluoroolefin with a vinyl ester, employed as coatings on organc polymers excel coatings described in the art. These include adhesion, thermal stability, sunlight resistance, scratch resistance and formability. In particular, the present compositions yield good adhesion and high scratch resistance at lower SiO$_2$ concentrations, where craze resistance and formability are high. They are thus vastly superior to previous compositions based on polysilicic acid/polyvinyl alcohol and derivatives, including the partial acetals or acetates. Furthermore, the new polysilicic acid/copolymer compositions containing a plurality of fluorine atoms and chain alcoholic hydroxyl groups are readily applied to surfaces, e.g., by dipping a sheet to be coated in a solution of polysilicic acid/copolymer, followed by evaporation of the solvent. Useful coatings are obtained without further treatment, particularly for compositions having a relatively high (70% or more) silica content. However, it is generally preferred to heat the coating at a temperature that does not harm the substrate to obtain superior properties. Useful temperatures are usually within the range of 90–180° C., e.g., 140–160° C., for times of a few minutes to an hour or more, suitably half an hour.

The relative value of scratch-resistant coatings can be assessed by physical observations. In the description that follows, the physical characteristics of the coatings were determined by conventional methods, e.g., the coating thickness can be measured by interferometry [see Bechtold, J. Opt. Soc., 37, 873–8 (1947)]. Resistance to exposure was observed by the use of the carbon arc Weather-Ometer (ASTM E42–57) and outdoor testing. Scratch resistance can be quantitatively determined by the Taber abraser [American Standards Association Test Z26.1–1950] and the falling carborundum test [ASTM D673–44]. Haze and luminous transmittance are determined by ASTM D1003–61. Other tests also useful include application of soap (e.g., mark with soap, keep at 100% R.H. for 16–64 hours) and soap solutions, washing, wiping, rubbing with steel wool, etc.

The following is a description of a wiping tester that has been found especially useful in determining the superior scratch-resistant properties of the products of this invention: To a 12″ long crank arm attached one inch off center to a wheel driven by a motor at a speed of 60–72 r.p.m. is further attached at the other end a half cylinder of about 2″ diameter and length. To the curved bottom is attached generally about eight thicknesses of cheesecloth, the cloth saturated with the whiting, abrasive or cleanser, either dry or wet with the weight being generally about 100 g. on the pad. Comparisons are obtained after a cycle of generally 600 oscillations. Panels of uncoated poly(methyl methacrylate) are severely scratched and rated 0%; coated panels showing no scratches are rated 100%; and intermediate ratings are obtained by comparisons with uncoated panels abraded at less than 600 oscillations. For example, a coated panel scratched as much at 600 oscillations as a non-coated panel at 60 oscillations is rated 90% while a panel abraded as much at 600 oscillations as a non-coated panel is at 450 oscillations is rated 25%.

EMBODIMENTS OF THE INVENTION

The following examples illustrate specific embodiments of this invention. In these examples, parts, percentages and ratios are by weight unless otherwise noted. A preferred embodiment is represented by Example V.

Example I

A polysilicic acid solution was prepared by mixing 200 g. of ethyl silicate, 139.6 g. of absolute ethanol, and 45 g. of 0.1 N hydrochloric acid at room temperature. A single phase was obtained and the temperature rose to about 50° C. in 4 minutes. The solution contained about 15% of silica (as $SiO_2$) and was stable at room temperature without gelation for about 4 months.

A solution of 10 g. of a hydrolyzed copolymer of tetrafluoroethylene/vinyl acetate of molar ratio of 1/3 in 90 g. of 95% ethanol was obtained by charging the ingredients into a glass container and rolling or rotating at a low speed to provide a uniform solution.

The above solutions were mixed to obtain the following:

(A)

| | G. |
|---|---|
| Polysilicic acid solution (15% $SiO_2$) | 66.7 |
| Acetic acid | 66.7 |
| 95% ethanol | 33.3 |

The above were mixed to form a solution and then further mixed with 33.3 g. of the above solution of hydrolyzed copolymer of tetrafluoroethylene and vinyl acetate. The solution thus contained a ratio of 75 $SiO_2$/25 copolymer.

(B)

| | G. |
|---|---|
| Polysilicic acid solution (15% $SiO_2$) | 33.3 |
| Acetic acid | 66.7 |
| 95% ethanol | 50 |

The above were mixed to form a solution and then further mixed with 50 g. of the preceding solution of hydrolyzed copolymer of tetrafluoroethylene/vinyl acetate copolymer to give a solution with a ratio of 50 $SiO_2$/50 copolymer.

C. A solution was obtained by mixing 30 g. of the 15% $SiO_2$ solution and 15 g. of the copolymer solution to give a solution with a ratio of 75 $SiO_2$/25 copolymer.

D. A total of 50 g. of the preceding solution (C) was mixed with 2 g. of butyl "Cellosolve."®

Panels of cast poly(methyl methacrylate) sheeting were dipped in the above solutions for 2 minutes, withdrawn vertically, then baked ½ hour at 140° C. The coated panels had good to excellent scratch resistance. Panels having a coating of solution B were also baked at temperatures of 150 and 160° C. A panel precoated with solution A was additionally coated with solution B and baked to give an adhesive scratch-resistant coating.

Panels exposed to weather were wiped with a cloth every two weeks. After exposure for over 18 months, the coated panels were markedly superior to uncoated panels in appearance.

Example II

To a solution weighing 127.6 g. and containing 5.485% of a hydrolyzed copolymer of tetrafluoroethylene/vinyl acetate of molar ratio of 1/3.54, 86.1% of ethanol and 8.4% of water was added 9 g. of butyl "Cellosolve."® To this was added successively 6.7 g. of a solution containing 15% of polysilicic acid ($SiO_2$) in ethanol (obtained as shown in Example I) and then allowed to age 2 days. The solutions obtained contained the following proportions of $SiO_2$/hydrolyzed copolymer of tetrafluoroethylene with vinyl acetate.

| Identity: | Ratio of $SiO_2$/tetrafluoroethylene copolymer |
|---|---|
| A | 12.5/87.5 |
| B | 22.2/77.8 |
| C | 30/70 |
| D | 36.4/63.6 |
| E | 41.7/58.3 |
| F | 46.2/53.8 |
| G | 50/50 |

Poly(methyl methacrylate) panels were dipped in the above solutions and wtihdrawn vertically, after 2 minutes, at a rate of 4–6″/minute, then baked ½ hour in air at 140°, 150° or 160° C.

Although all of the coated panels had improved scratch resistance, superior combinations of appearance, adhesion and scratch resistant occurred with the higher baking temperature (160° C.) and with higher silica concentrations, especially with solutions D, E, and F.

Strips of the coated poly(methyl methacrylate) were bent while hot (at end of baking period) to about a three inch radius. Those coated with solutions D and E showed no tension or compression cracking or wrinkling.

Example III

A solution was prepared by mixing a solution of 51 g. of 5.6% by weight of hydrolyzed tetrafluoroethylene/vinyl acetate copolymer (molar ratio of ⅓) in 70–30 ethanol/water with a solution of silicic acid consisting of 40 g. of 70/30 ethanol/water, 6 g. of acetic acid and 29 g. of 15% $SiO_2$ alcoholic ethyl silicate. The ratio of $SiO_2$/hydrolyzed copolymer was about 60/40. Two other solutions were made from this, containing 6 and 12 g. increments of acetic acid, respectively.

Panels of poly(methyl methacrylate) were dipped into the above solutions (after the solutions were aged 6 days) at a withdrawal rate of 3–6″/min. and baked at 140° C. for ½ hour. Clear coatings of good adhesion and scratch resistance were obtained. With increasing acetic acid content of the solutions, increased surface smoothness of the coated polymer resulted.

Example IV

A coating solution was prepared containing 75 g. of a 4.90% hydrolyzed tetrafluoroethylene/vinyl acetate copolymer (of 1/7 molar ratio) in 70/30 ethanol/water, an additional 50 g. of 70/30 ethanol/water and 10 g. of silicic acid (15% $SiO_2$) in ethanol/water. The final coating solution contained $SiO_2$/copolymer in a ratio of 29/71. Panels of poly(methyl methacrylate) were dipped in the above solution, withdrawn at a rate of 3″/min. and baked ½ hour at 150° C. The resulting coating had improved scratch resistance but was slightly hazy. The addition of 6 g. of butyl "Cellosolve"® gave a clear coating with better adhesion.

When the ratio of vinyl ester to tetrafluoroethylene was greater than 7/1, resulting coatings had poor adhesion to organic polymer substrates and tended to give hazy coatings. The addition of methyl "Cellosolve"® or acetic acid gave clear coated panels at these ratios.

Example V

A bath of 44.25 silicic acid ($SiO_2$)/55.75 hydrolyzed copolymer of tetrafluoroethylene/vinyl acetate of about 1/3 molar ratio was prepared and used to coat 152 poly (methyl methacrylate) sheets. Of these sheets, 134 were 2 x 3 ft. in size and were coated on both sides for an area of about 766 sq. ft. Eighteen were smaller panels curved during or after baking. The total surface coated was 1081 sq. ft. The actual withdrawal rates from the bath ranged from 11.3″/min. to 15.1″/min., depending on sheet thickness, and an average of 5.45 g. of solution was withdrawn for each square foot of coated surface (10.9 g. for two sides). The sheets were baked ½ hour at 150° C.

During the coating time, which lasted 7 days, it was found that modification with about 3.3% of butyl "Cellosolve"® yielded sheets which could be exposed to at least 80% R.H. air for 5 minutes, then baked without development of haze due to humidity. Prior to this, the first 48 sheets, although withdrawn in 40% R.H. air for only 4–5 minutes before baking, exhibited about a 1″ band of haze at the top. Nevertheless, the bottom 95% of the coated area was substantially clear.

The coating bath initially employed had the following composition:

2680 g. of 8.56% hydrolyzed tetrafluoroethylene/vinyl acetate in methanol (pH=8.5),
80 g. of 1% HCl in methanol (pH after addition, 4.35)
320 g. of methanol,
1200 g. of hydrolyzed tetraethylsilicate made by mixing 100 parts of $(EtO)_4Si$ with 69.5 parts of ethanol and 22.5 parts of 0.1 N hydrochloric acid 2.5 days before use.
1720 g. of glacial acetic acid,
1.28 g. of organo-silicone (Union Carbide Corp. organosilicone "L-530," a block copolymer of mixed lower alkylene oxides with dimethyl siloxane)

6001.28 g. Apparent pH=.38 (pH after dilution with water, 2.25).

The solution therefore contained 3.78% of hydrolyzed tetrafluoroethylene copolymer and 3% of polysilicic acid calculated as $SiO_2$.

After about 8 hours, a ¼ portion of the formulation of the original bath was added and during the next 24 hours, about 260 g. of the bath were removed. The bath then contained about 5100 g. of material and 175 g. of butyl "Cellosolve"® in 235 g. of acetic acid were added. After further use at approximately daily intervals, additional portions of the original formulation were added to give a total bath content of 11,800 g. of which 6,010 g. was used in coating. The amount of coating of solid per sq. ft. per side of plastic sheet was about 0.37 g.

The thickness of the applied coatings was $3.22\mu$ with an average deviation from the means of $0.16\mu$ (<5%) for 71 measurements made. The average values of each of five sheets (selected from 152 prepared) also had a deviation from their mean of <5%. The coating had a density of about 1.25 g./cc.

A coated poly(methyl methacrylate) sheet prepared substantially as above was compared with a sheet coated with a solution containing polyvinyl alcohol-propanol/polysilicic acid in the ratio of 60% $SiO_2$ to 40% organic polymer. The $SiO_2$/polyvinyl alcohol coating failed at 350 hours in a carbon arc Weather-Ometer (at a sequence of 102 min. dry followed by 18 min. spray, the surface reaching a temperature of 63° C. before spray); whereas the $SiO_2$/hydrolyzed vinyl acetate tetrafluoroethylene-coated polymer was in satisfactory condition four times as long (1391 hours). Using a wiping tester under 100 g. load with 600 cycles with wet whiting as an abrasive, the scratch resistance of the initial coatings was 99% for the new product compared to 92% for the $SiO_2$/polyvinyl alcohol coating. After one hour in water at 60° C. the new product had a rating of 96% compared to 70% and after 64 hours in water at room temperature the rating of the new polyfluoroethylene-modified silica was 87% compared to 0% for the silica/polyvinyl alcohol-propanol coated material.

Example VI

When the copolymer used in Example III was employed with the exception that the ratio of $SiO_2$/hydrolyzed copolymer was about 50/50 and more acetic acid and an extremely small amount of the organosilicone described in Example V were used, coated panels that were obtained had a thickness of about $2.7\mu$ with no optical surface irregularities and good scratch resistance and adhesion of the coating. Similar results were obtained with a 50 silica/50 copolymer of Example IV.

In contrast to the above, when a hydrolyzed copolymer containing a molar ratio of more than 7/1 of vinyl acetate to tetrafluoroethylene (i.e., ratio of F to secondary hydroxyl was about 4/7), the coatings were silky, crazed readily, were only poor to good in scratch resistance and had poor adhesion.

Example VII

A solution was prepared containing (a) 57.5 g. of a solution of 8.75% of hydrolyzed tetrafluoroethylene/vinyl acetate (of ratio of about 1/3) in ethanol/water (89/11), (b) 22.5 g. of 15% silica in alcohol, (c) 40 g. of acetic acid and (d) 0.032 g. of organosilicone as specified in Example V. The solution was applied to various sheets as described in Example I. The sheets were poly(methyl methacrylate), bonderized steel, and both aluminum alloy and anodized aluminum. Adhesion was excellent and scratch resistance was good for all coatings with excellent surface appearance.

Example VIII

Various coating solutions were made up as follows:

A solution was prepared containing 20 g. of polysilicic acid (15% $SiO_2$) and 70 g. of a t-butyl alcohol solution containing 10% of a 2-hydroxypropyl vinyl ether/tetrafluoroethylene copolymer (1/1 mole ratio). The ratio of silica to copolymer was 30/70.

A total of 88.5 g. of solution A was mixed with 10 g. of the original polysilicic acid solution and with 0.046 g. of organosilicone of Example V to give a solution in which the ratio of $SiO_2$/polymer was 39.1/60.9.

To 97 g. of B above was added 5 g. of 15% silica solution and 5 g. of acetic acid to give a solution of ratio of $SiO_2$/polymer of 42.9/57.1.

To 106 g. of solution C were added 10 g. of silica solution and 0.046 g. of the organo-silicone to give a solution with the ratio 49.1 silica/50.9 polymer.

To 109 g. of the preceding solution was added 20 g. of silica solution and 5 g. of acetic acid to give a 58.2/41.8 silica/polymer solution.

By addition of 20 g. of silica solution and 5 g. of acetic acid to the preceding solution, one of 64.6/35.4 silica to polymer ratio was obtained.

The above solutions were coated on poly(methyl methacrylate) panels to give panels having fair to good scratch resistance. Some, however, were slightly silky and slightly hazy. At highest silica content, some crazing during baking was noted.

Example IX

A solution containing a 90/10 ratio of $SiO_2$/hydrolyzed tetrafluoroethylene/vinyl acetate copolymer (molar ratio 1/2.4) was prepared by adding to 100 g. of a 15% silica solution of polysilicic acid in ethanol (aged 14 days), 16.21 g. of a solution containing about 10% of the copolymer in methanol. Panels of poly(methyl methacrylate) were coated with the above solution. On drying at room temperature, a slightly hazy coating that had good scratch resistance to steel wool, and fair to good adhesion without crazing, was obtained. Upon the addition of about 4 g. of buty "Cellosolve"® to the solution, a similar coating, except that it was softer, was obtained, which upon baking crazed slightly but was clear, hard and adherent.

The polysilicic acid employed in this invention with the hydroxyl-containing, fluorine-containing polymers is readily available. For example, ethyl silicate (tetraethyl orthosilicate) is a commercial product. It is soluble in organic solvents and readily hydrolyzed by water to a useful soluble polysilicic acid. By use of varying amounts of water, the exact degree of hydrolysis can be varied. A compatible solvent is a lower alcohol, particularly ethanol. A general formula for the preparation of the polysilicic acid solutions (15% $SiO_2$) requires 100 parts of ethyl silicate and 92-X parts of ethanol or similar diluent where X is the amount of water or preferably 0.1 N hydrochloric acid. In general, X is preferably about 22.5 or more. When X is 18 or less, the hydrolysis of ethyl silicate is insufficient to give a useful polysilicic acid for present purposes unless further hydrolysis is brought about in the coating solution or process. Although more water can be used, i.e., X=50 or more, large amounts may affect adversely the compatibility with some of the organic polymers used. The commercial condensed polysilicates such as ethyl silicate containing about 40% $SiO_2$, can also be used when hydrolyzed to an appropriate degree.

Solutions containing mixtures of polysilicic acid with hydrolyzed copolymers of tetrafluoroethylene and vinyl acetate can be mixed with polyvinyl alcohol to obtain useful coatings. No real superiority is achieved, however, until the amount of fluorine in the mixture is sufficient to give a ratio of greater than one fluorine per two hydroxyls and preferably 1/1 or more to adhere to poly (methyl methacrylate) substrates. On a percentage basis, the amount of fluorine in the organic polymers used (with $SiO_2$) should exceed 15% and is generally 18–50%.

The polymeric fluorine-containing and hydroxyl-containing materials employed in the production of the new siliceous coatings are readily available by conventional means (see, for example, Hanford et al., U.S. Patent No. 2,468,664). For example, fluorine-containing monomers, such as tetrafluoroethylene, trifluorochloroethylene, vinylidene fluoride, hexafluoropropene, trifluoroethylene, vinyl fluoride, or mixtures thereof copolymerize with vinyl esters in varying ratios. Other vinyl esters include vinyl formate, vinyl propionate and vinyl butyrate.

In addition to vinyl esters, other polymerizable monomers can be used in suitable ratios to give polymers containing hydroxyl groups on carbon within a chain. Although it is preferred that the chain be the main one of the polymer, pendent chains can bear hydroxyl on any except the last carbon of a chain, such as in hexene-3-ol, 4-vinylcyclohexanol, methyl vinyl carbinol, dimethyl vinyl carbinol, 2-hydroxypropyl vinyl ether, 2-hydroxybutyl vinyl ether, 3-hydroxy-2,2,4-trimethylpentyl vinyl ether, and 2-hydroxyhexyl vinyl ether. In place of the alcohol, esters can be used in the polymerization and the resultant polymer hydrolyzed to produce polymeric material containing a plurality of fluorine atoms and

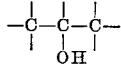

groups.

The copolymerization of the fluorine-containing monomer and vinyl acetate or other copolymerizable monomer can be carried out in pressure-resistant vessels with free-radical generating catalysts, preferably of the azo type (U.S. Patent No. 2,471,959). The exact conditions can be varied according to the desired relative ratios and reactivity of the monomers employed and are otherwise similar to those of U.S. Patent No. 2,468,664. Hydrolysis of the resulting vinyl ester copolymer gives polymers containing a plurality of the fluorine-containing monomer units and the vinyl alcohol (—$CH_2CHOH$—) units.

The following is a description of a preferred method of preparation of a hydrolyzed copolymer of vinyl acetate with tetrafluoroethylene: Into a 2-gallon autoclave was charged

| | |
|---|---|
| Water, ml. | 4000 |
| Vinyl acetate, g. | 1040 |
| Tetrafluoroethylene, g. | 800 |
| Isopropanol, ml. | 60 |
| $NaH_2PO_4$, g. | 14 |
| "Duponol"® ME (sodium alkyl sulfonate), g. | 20 |
| Azobiisobutyramidine·HCl, g. | 6 |

Polymerization took place at a temperature of 50° C. for 0.6 hour at a pressure (autogenous) of 400–450 p.s.i. A stable emulsion, easily discharged from the autoclave, was obtained. Conversion based on vinyl acetate was essentially 100%. Approximately 65% of the charged tetrafluoroethylene monomer was incorporated into the polymer to give 1500 g. of a copolymer of vinyl acetate/tetrafluoroethylene of molar ratio 2.4/1, $\eta_{inh}$ of 2.45, refractive index of 1.40–1.41 and M.W. (light scattering) of about 750,000.

The emulsion was coagulated by mechanical shear in conjunction with the addition of a small quantity of saturated NaCl solution. Flocculation of the fine particles was accomplished by blowing steam directly into the coagulation vessel and heating the contents to about 50° C. A sandy product (about 500μ particle size) of easily washed material was obtained. On drying, the small particles tended to agglomerate. Passage through a small Abbé cutter gave an average particle size of roughly 1000μ.

A total of 5 pounds of the vinyl acetate/tetrafluoroolefin copolymer obtained as above was hydrolyzed in a ten-gallon, glass-lined kettle. The charge consisted of: 2268 g. of the copolymer, 13,211 g. of methanol, and 4.5 g. of sodium methoxide. At a temperature of 50° C. five hours were required before elimination of the carboxyl stretching peak of 1700 cm.$^{-1}$. Subsequent to hydrolysis, the solution was passed through a Sparkle filter to remove foreign particles (lint, etc.). The clear, slightly yellow solution had a solids content of 10.2% and a Brookfield viscosity (corrected to 10% solids) of 2200 cp.

In accord with the invention, it is merely necessary to employ a polymer that contains a plurality of fluorine and secondary or tertiary alcoholic hydroxyl. These can be derived from either one monomer or two or more monomers such that the final product contains a plurality of alcoholic hydroxyls on carbon that has no more than one hydrogen and the ratio of fluorine to hydroxyl is at least 1 fluorine to 2 hydroxyls and generally between 4 fluorines to 7 hydroxyls and 10 fluorines to 1 hydroxyl. Polymeric materials of superior stability to heat and light and good transparency are particularly desired. The polymers should be free from labile and reactive groups such as thiol, primary amino, etc. Preferably the polymers have halogen (including fluorine and chlorine), carbon, oxygen and hydrogen.

It is important that the fluorine content be in the indicated range to reduce refractive index and glare, to provide a particularly useful combination of adhesion, resistance to weather and a high ratio of scratch resistance to $SiO_2$ content. In general, the fluorine content in the solid polymer having both fluorine and secondary or tertiary alcoholic hydroxyl as the only alcoholic hydroxyls present is usually within the range of about 19–64%.

The fluorine-containing polymer can be purified by conventional techniques, as described, before it is mixed with polysilicic acid.

Solvents useful for the preparation of coating compositions depend on the polymeric materials employed, the substrate, and other factors such as evaporation rate and moisture content of surrounding atmosphere. The solvent should boil below 150° C. and preferably below 125° and have appreciable vapor pressure at below 100° C. It should be compatible with the ingredients in a wide range of proportions. The solvents are polar in nature. Preferred solvent systems have at least 50% of 1–5 carbon alkanols (e.g., methanol, ethanol, propanols, butanols), 2–15% water and up to about 40% of 1–3 carbon alkanoic acids (e.g., formic, acetic, propionic). Minor amounts of halogenated (chlorine and/or fluorine-containing) solvents such as trichloroethylene can be present. For coating poly(methyl methacrylate), at least 10% alkanoic acid should be present.

As previously demonstrated, the amount of hydroxyl- and fluorine-containing polymeric material and polysilicic acid (calculated as $SiO_2$) are in a 10–90 to 90–10 proportion. Within this range are obtained improved and useful combinations of surface hardness, adhesion, and optical quality.

The use of solutions, as indicated above, gives high quality coatings, particularly in relatively thin layers. However, when thick layers of high optical quality are desired, it has been found that leveling agents, flowing agents or stabilizers compatible with the ingredients employed aid in attaining this goal. Selection is necessary for specific systems from surface-active materials available for such purpose. Examples of compositions that have been found useful are organosilicones derived from relatively low molecular weight block copolymers of mixed polyalkylene oxides and dimethyl siloxane, such as of the type described in U.S. Patent 3,172,899 or French Patent 1,330,956. "Cellosolve"® derivatives are useful as antihaze or antiblushing agents.

The solutions used in coating are stable for a period of a few days to a few weeks, particularly if care has been taken to employ relatively pure ingredients and compatible solvents and additives.

The solutions can be applied to the surfaces to be protected by known methods such as flowing, spraying, or dipping, depending on the thickness, properties desired on the substrate, etc. Although substrates of relatively soft plastic sheet materials show considerable improvement after application, the coating composition can be applied to other materials, including painted surfaces, metals, glass, wood, fibers, textiles and thin polymeric films. The composition can be pigmented or dyed before application. Fibers, films and cast objects that are of increased stiffness (compared with the unmodified fluorinated and hydroxylated organic polymer) can be prepared from the composition of this invention.

The final hard coating results from removal of solvent and volatile materials. This can be accomplished by air drying or by the use of heat as in an oven. Higher temperatures which do not cause substantial changes in the shape of the substrate facilitate removal of solvent and possible reaction of the polysilicic acid and hydroxylated polymer to form hard cured surface coating resistant to moisture, soaps, and organic liquids.

Although thin coatings, e.g., $0.1\mu$, can be employed, thicker coatings, e.g., $2\mu$ to $8\mu$ or more, are particularly useful to give greater resistance to coarse abrasives than thinner coatings. Heretofore, there has been difficulty in obtaining thick coatings of good resistance to cracking in response to tensile stresses during weathering. A greater concentration of fluorinated hydroxylated organic polymer, i.e., as compared with the prior art organic polymers, can be used without serious loss in hardness, and consequently the plasticizing effect is greater.

The compositions of this invention furnish insoluble, inert, abrasion-resistant, corrosion-resistant finishes that are also useful in changing the surface frictional, electrical, gas permeability, liquid and ionic diffusional properties and the optical properties (refractive index) of mechanical, electrical, optical, osmotic, filtration or other devices or essential parts thereof as well as the properties of leather, fibers, fur and textiles. By choice of solvent and component polymers, application conditions and pretreatments (including prime-coating) of the substrates, they can be adhered to substantially all solid surfaces. The composition of this invention is therefore useful for coating on wood, metal, glass, and relatively dimensionally stable synthetic organic polymeric materials in sheet or film form such as poly(methyl methacrylate), polyesters (including objects having fiber fillers), polyamides, polyimides, copolymers such as of acrylonitrile/butadiene/styrene, etc. It can be applied to natural and synthetic fibers or fibrous products and as coatings in contact with antireflective layers for optical applications. Pigments, metal flakes or dyes can be added to the coating composition and applied to various objects such as automotive bodies and parts, refrigerators, etc. Polymeric materials coated with these new compositions are useful in the fabrication of flat or curved plastic enclosures, such as windows, skylights, windshields, lenses, etc., particularly for transportation equipment. The composition can aslo be used to give cast objects, including fibers and films, of relatively high stiffness, e.g., by use of polytetrafluoroethylene substrate in a suitable form such as a film from which the object can be removed. The composition can also be used as an impregnant for porous bearings or in paper, leather, etc.

Since obvious modifications and equivalents in the invention will be evident to those skilled in the chemical arts, we propose to be bound solely by the appended claims.

The embodiments of the invention in which an exclusive property or privilege is claimed are defined as follows.

We claim:

1. A complex comprising about 10–90 percent by weight of polysilicic acid calculated as $SiO_2$ and about 90–10 percent of a preformed organic copolymer having at least about 18% by weight of fluorine and a plurality of alcoholic hydroxy groups, bonded to carbon bearing no more than one hydrogen, the remaining bonds of said carbon being attached to other carbons, such hydroxyl groups being substantially the only hydroxy groups in said copolymer, the ratio of fluorine atoms to hydroxyl groups being in the range 1:1 to 4:1, said copolymer being a copolymer of at least one polymerizable fluoroolefin of theg roup consisting of tetrafluoroethylene, trifluorochloroethylene, vinylidene fluoride, hexafluoropropene, trifluoroethylene and vinyl fluoride and at least one member of the group consisting of vinyl esters, said vinyl esters being hydrolyzed after polymerization with the fluorine-bearing member, and lower secondary hydroxyalkyl and hydroxycycloalkyl vinyl ethers.

2. A complex of claim 1 containing 20–50 percent of polysilicic acid calculated as $SiO_2$.

3. A complex of claim 1 containing 30–47 percent of polysilicic acid calculated as $SiO_2$ 4. A transparent complex of claim 1.

5. A complex of claim 1 carrying entrapped pigment.

6. A composition of matter comprising a major portion of a complex of claim 1 and a minor portion of a pigment or other inert material.

7. A complex of claim 1 wherein the copolymer is a hydrolyzed copolymer of a polymerizable fluoroolefin and a vinyl ester.

8. A complex of claim 1 wherein the copolymer is a hydrolyzed copolymer of a polymerizable fluoroolefin and vinyl acetate.

9. A coating composition comprising a solution in a compatible solvent of complex-forming materials consisting essentially of about 10–90 percent of polysilicic acid calculated as $SiO_2$ and about 90–10 percent of a preformed organic copolymer having at least about 18% by weight of fluorine and a plurality of alcoholic hydroxy groups bonded to carbon bearing no more than one hydrogen, the remaining bonds of said carbon being attached to other carbons, such hydroxyl groups being substantially the only hydroxyl groups in said copolymer, the ratio of fluorine atoms to hydroxyl groups being in the range 1:1 to 4:1, said copolymer being a copolymer of at least one polymerizable fluoroolefin of the group consisting of tetrafluoroethylene, trifluorochloroethylene, vinylidene fluoride, hexafluoropropene, trifluoroethylene and vinyl fluoride, and at least one member of the group consisting of vinyl esters, said vinyl esters being hydrolyzed after polymerization with the fluorine-bearing member, and lower secondary hydroxyalkyl and hydroxycycloalkyl vinyl ethers, said solution containing about 2 to 25 percent by weight of complex-forming materials.

10. A coating composition of claim 9 wherein the solution contains additionally a pigment.

11. A coating composition of claim 9 wherein the complex-forming materials contain 20–50 percent of polysilicic acid calculated as $SiO_2$.

12. A coating composition of claim 9 wherein the complex-forming materials contain 30–47 percent of polysilicic acid calculated as $SiO_2$.

13. A coating composition of claim 9 wherein the hydroxyls are attached to chain carbons of a copolymer having a degree of polymerization of at least 100.

14. A coating composition of claim 9 wherein the copolymer is a hydrolyzed copolymer of a polymerizable fluoroolefin with a vinyl ester.

15. A coating composition of claim 9 wherein the copolymer is a hydrolyzed copolymer of tetrafluoroethylene and vinyl acetate, the mole ratio of tetrafluoroethylene to vinyl acetate being in the range of about 1/2 to 1/5.

16. A coating composition comprising a solution, in a solvent medium containing water and a lower alkanol, of 2 to 25 percent by weight of complex-forming materials, said complex-forming materials consisting essentially of polysilicic acid and a hydrolyzed copolymer of tetrafluoroethylene and vinyl acetate, the weight ratio of polysilicic acid calculated as $SiO_2$ to copolymer being in the range of about 1/9 to 9/1 and the mole ratio of tetrafluoroethylene to vinyl acetate in the copolymer being in the range of about 1/1 to 1/7.

17. A solid article serving as a substrate carrying bonded thereto a coating formed from a complex of claim 1.

18. Transparent sheets carrying bonded thereto a coating formed from a complex of claim 1.

19. Poly(methyl methacrylate) sheets carrying bonded thereto a coating formed from a complex of claim 1.

20. The process of coating a solid article which comprises contacting the same with a coating composition of claim 9.

21. The process of claim 20 wherein the contacting is accomplished by dipping.

22. The process of claim 20 followed by the sequential step of removing volatile materials from the coating.

23. The porcess of claim 22 in which the volatile materials are removed by air drying.

24. The process of claim 22 in which the volatile materials are removed by heating at a temperature in the range of about 90–180° C.

25. The complex of claim 1 wherein the polymerizable fluoroolefin is tetrafluoroethylene.

26. The complex of claim 1 wherein the polymerizable fluoroolefin is chlorotrifluoroethylene.

27. Polyester sheets carrying bonded thereto a coating formed from a complex of claim 1.

References Cited

UNITED STATES PATENTS

| | | | |
|---|---|---|---|
| 2,317,891 | 4/1943 | Dennison | 260—29.6 |
| 2,592,147 | 4/1952 | Ikeda | 260—29.6 |
| 2,600,683 | 6/1952 | Pearson | 260—87.1 |
| 2,906,658 | 9/1959 | Doban | 260—29.6 |
| 3,324,055 | 6/1967 | Marks et al. | |

SAMUEL H. BLECH, *Primary Examiner.*

J. W. SNOW, *Assistant Examiner.*

U.S. Cl. X.R.

260—87.1, 80.75, 827, 41, 33.4; 117—138.8, 161